United States Patent
Wang et al.

(10) Patent No.: US 8,634,715 B2
(45) Date of Patent: Jan. 21, 2014

(54) SYSTEM AND METHOD FOR DEMAND AGGREGATION IN OPTICAL NETWORKS EMPLOYING SHARED RING PROTECTION

(75) Inventors: Xi Wang, Murphy, TX (US); Qiong Zhang, Plano, TX (US); Paparao Palacharla, Richardson, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 339 days.

(21) Appl. No.: 13/022,128

(22) Filed: Feb. 7, 2011

(65) Prior Publication Data

US 2011/0206374 A1 Aug. 25, 2011

Related U.S. Application Data

(60) Provisional application No. 61/308,156, filed on Feb. 25, 2010.

(51) Int. Cl.
*H04B 10/00* (2013.01)

(52) U.S. Cl.
USPC ..................................... 398/59; 398/3; 398/4

(58) Field of Classification Search
USPC ............................................. 398/2–7, 57–59
See application file for complete search history.

(56) References Cited

U.S. PATENT DOCUMENTS

| | | | |
|---|---|---|---|
| 2006/0039696 A1* | 2/2006 | Saniee et al. | 398/3 |
| 2008/0037988 A1* | 2/2008 | Bullock | 398/59 |
| 2008/0159742 A1* | 7/2008 | Krishnaswamy et al. | 398/79 |
| 2009/0129771 A1* | 5/2009 | Saniee et al. | 398/3 |

OTHER PUBLICATIONS

Internet site www.sonet.com, 14 pages, Printed Feb. 7, 2011.
Alexander Schrijver et al., "The Ring Loading Problem", Siam J. Discrete Math. vol. 11, No. 1, pp. 1-14, Feb. 1998.
Timothy Y. Chow et al., "The Ring Grooming Problem", Wiley Periodicals, Inc., pp. 194-202, Jan. 2004.
Mordechai Shalom et al., "A 10/7 +ϵ Approximation for Minimizing the Number of ADMs in SONET Rings", IEEE/ACM Transactions on Networking, vol. 15, No. 6, pp. 1593-1602, Dec. 2007.
Peng-Jun Wan et al., "Grooming of Arbitrary Traffic in SONET/WDM BLSRs" IEEE Journal on Selected Areas in Communications, vol. 18, No. 10, pp. 1995-2003, Oct. 2000.

* cited by examiner

*Primary Examiner* — Dzung Tran
(74) *Attorney, Agent, or Firm* — Baker Botts L.L.P.

(57) ABSTRACT

In accordance with embodiments of the present disclosure, a method for demand aggregation is provided. The method may include routing demands in a ring network such that a length for each routed demand does not exceed a route length maximum, and a load imbalance at each node in the ring network is minimized. The method may also include maximizing optical line card sharing by assigning routed demands sharing common ends to the same wavelength.

21 Claims, 3 Drawing Sheets

| DEMAND | BANDWIDTH | ROUTING |
|---|---|---|
| 102a-102b | 48 | CLOCKWISE |
| 102a-102c | 48 | CLOCKWISE |
| 102a-102d | 48 | COUNTER-CLOCKWISE |
| 102a-102e | 36 | COUNTER-CLOCKWISE |
| 102c-102d | 12 | CLOCKWISE |
| 102d-102e | 12 | CLOCKWISE |

000

SYSTEM AND METHOD FOR DEMAND AGGREGATION IN OPTICAL NETWORKS EMPLOYING SHARED RING PROTECTION

CROSS-REFERENCE TO RELATED APPLICATIONS

This application claims the benefit of U.S. Provisional Application No. 61/308,156 filed on Feb. 25, 2010, entitled "Demand Aggregation for Shared Ring Protection in Optical Networks", which is incorporated herein in its entirety.

TECHNICAL FIELD OF THE INVENTION

The present invention relates generally to optical networks and, more particularly, to a device for phase modulation in an optical network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. An optical network may be configured to combine modulated signals at various wavelengths or optical frequencies (also known as "channels") into a single optical fiber. Each disparate channel may include optically encoded information to be communicated throughout the optical network. Such combining of various channels into a single fiber is known as wavelength-division multiplexing (WDM). Dense wavelength division multiplexing (DWDM) refers to multiplexing a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information.

Optical networks may be using any one or a number of topologies, including mesh networks, point-to-point networks, ring networks, and others. A ring network is a network topology in which each node connects to exactly two other nodes, forming a single continuous pathway for signals through each node—a ring. Data travels from node to node, with each node along the way handling every packet.

Optical networks often employ redundancies to maximize performance and availability. In ring networks, such redundancies may include shared ring protection schemes such as bidirectional line switched ring (BLSR). With BLSR, rather than sending redundant copies of packets from ingress to egress, ring nodes adjacent to a failure may reroute traffic in an opposite direction of the ring in response to a failure. For example, if a failure occurs at a first node intermediate to a second node and a third node in which the first node and second node are "counterclockwise" to the third node, third node may reroute traffic intended for the second node in a "clockwise" direction (e.g., via nodes other than the first node).

To reduce network cost and complexity, it is often desirable to employ demand aggregation in an optical network. In general, demand aggregation may refer to aggregating multiple lower rate traffic demands (e.g., bandwidth requests between two nodes) into higher rate WDM or DWDM channels such that equipment cost and complexity is minimized. To illustrate, a demand typically requires an optical line card (OLC) with an add-drop multiplexer to be allocated at the source and destination nodes of the demand. Because an OLC may be capable of aggregating multiple demands, sharing multiple demands among OLCs may reduce the total number of OLCs required for a give set of demands. In addition, multiple OLCs may be assigned to the same WDM or DWDM ring to reduce the total number of wavelengths used. Because network cost is typically driven by the number of OLCs and wavelengths, minimizing OLC and wavelength usage with demand aggregation may reduce network cost.

Existing approaches to demand aggregation in shared ring networks have disadvantages. For example, some traditional approaches split demand into separate rings or split over to another ring for better bandwidth utilization. Other approaches consider only the case of uniform traffic or assume routing is given. However, for practical applications, a demand aggregation approach is desired that supports non-uniform traffic demands, in which routing of each demand is not given, and demands cannot be split or switched over to another ring.

SUMMARY

In accordance with embodiments of the present disclosure, a method for demand aggregation is provided. The method may include routing demands in a ring network such that a length for each routed demand does not exceed a route length maximum, and a load imbalance at each node in the ring network is minimized. The method may also include maximizing optical line card sharing by assigning routed demands sharing common ends to the same wavelength.

Technical advantages of one or more embodiments of the present invention may include mechanism for shared ring protection in optical networks that allows for reduced optical line card utilization and reduced use of wavelength channels as compared to existing approaches.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention and its advantages are best understood by referring to FIGS. 1-5, like numerals being used for like and corresponding parts of the various drawings.

Figure 1:
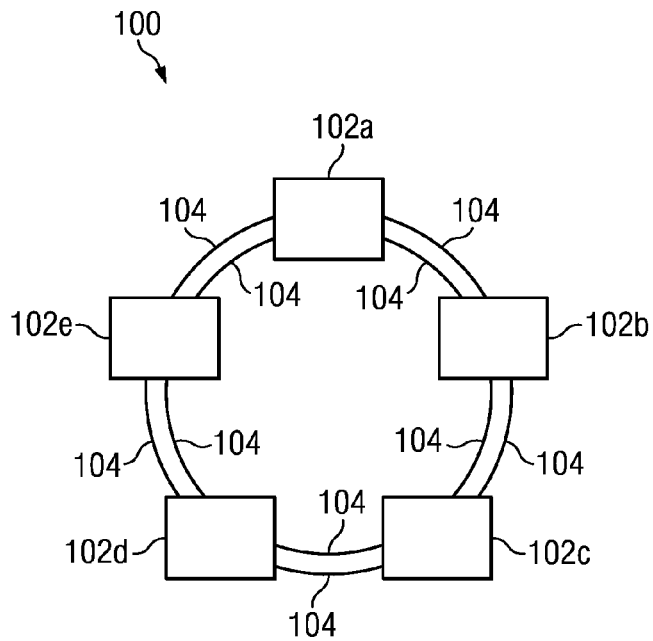
FIG. 1 illustrates a block diagram of an example optical communication network system, in accordance with embodiments of the present disclosure.

FIG. 1 illustrates a block diagram of an example optical communication network system, in accordance with embodiments of the present disclosure. Optical network system 10 includes components such as network nodes 102. In general, a network node 102 may include any suitable arrangement of components operable to perform the operations of the network node. As an example, a network node may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a network node operable to receive input for the network node, send output from the network node, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Network system 100 may communicate information through signals, such as an optical signal. For instance, an optical signal may have a frequency of approximately 1550 nanometers and a data rate of 10, 20, 40, or over 40 gigabits per second.

According to the illustrated embodiment, network system 100 may include one or more networks. A network may include nodes 102 coupled by fibers 104 in a ring topology as shown in FIG. 1. In the illustrated embodiment, the network includes five nodes, referenced as 102a, 102b, 102c, 102d, and 102e. These references are intended for use solely for ease of description. Although five nodes are illustrated, the network may contain more or fewer nodes, depending on the implementation desired. In some embodiments, network system 100 may be configured to employ a shared ring protection scheme (e.g., bidirectional line switched ring (BLSR)) to provide redundancy.

Network system 100 may be used in any optical communication network, or any other suitable network or combination of networks. Optical fibers 104 comprise any suitable type of fiber, such as a Single-Mode Fiber (SMF), Enhanced Large Effective Area Fiber (E-LEAF), or TrueWave® Reduced Slope (TW-RS) fiber.

In some embodiments, network system 100 may be designed to transmit each signal on a particular carrier wavelength. The number of wavelengths assigned may vary depending on the chosen implementation. As an illustrative example, network system 100 may carry 88 carrier wavelengths in the 1550 nm wavelength band, with a channel separation of 50 GHz (~0.4 nm). That is, network system 100 may potentially communicate information on carrier wavelengths between 1528.77 nm (196.1 THz) and 1563.45 nm (191.75 THz). In some embodiments, network system 100 may include some means of dynamically allocating incoming signals to various wavelengths, depending on the design needs, such that none, some, or all channels are in use at one time.

The process of communicating information over multiple channels of a single optical path is referred to in optics as wavelength division multiplexing (WDM). Dense wavelength division multiplexing (DWDM) refers to the multiplexing of a larger (denser) number of wavelengths, usually greater than forty, onto a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, network system 100 may be operable to transmit disparate channels using WDM, DWDM, or some other suitable multi-channel multiplexing technique, and to amplify the multiplexed wavelengths.

In operation, network system 100 may receive a number of demands for routing optical traffic. In some embodiments, optical traffic demands may include a diverse range of requests for data transmission, including fixed-bandwidth connections, bandwidth adjustable connections with or without a transmission deadline, connections with a default minimum or maximum bandwidth requirements, and/or connections with a maximum permissible delay. For example, network system 100 may represent a network for communication between large datacenters. These datacenters may represent processing centers for application providers. These applications may include data backups, streaming audio and/or video, voice over IP, data transmission applications (e.g., data transfer for purposes other than backup), or any other application that may require a massive amount of data transfer. An application provider may have a service level agreement ("SLA") with end users of such applications requiring a certain level of service, e.g., specified up time, guaranteed data transmission rates, etc. In allocating the resources of network system 100, an application provider, or other party responsible for maintaining and/or operating network system 100, may wish to provision the optical circuits of network system 100 in such a manner as to minimize the number of dedicated wavelengths while meeting the requirements of a given SLA. The application provider, or other party responsible for maintaining and/or operating network system 100, may also wish to provision a group of optical circuits of network system 100 at one time. This group of optical circuits may be between a first source node and a first destination node and/or between a plurality of source nodes and a plurality of destination nodes.

In the ring network of network system 100, each node 102 may have two links adjoining adjacent nodes 102, a "clockwise" link and a "counterclockwise" link. For example, node 102a may have a clockwise link coupling it to node 102b (the link to node 102b being a clockwise direction from node 102a), and a counterclockwise link coupling it to node 102e (the link to node 102e being in a clockwise direction from node 102a).

In operation, network system 100 or one or more individual components thereof (e.g., nodes 102), may perform demand aggregation for various demands of network system 100. As described in greater detail below, network system 100 may aggregate demands in accordance with a two-phase process. First, network system 100 may determine nearly load-balanced routing for all demands. In this first phase, network system 100 seeks to maximize load balancing and shortest path routing, while making tradeoffs between the two. Second, from a directed demand graph created from the routed demands, network system 100 may determine a set of closed and or open chains and groom the chains into shared protection rings. In this second phase, network system 100 seeks to maximize optical line card (OLC) sharing by assigning the same wavelength to the routed demands sharing common ends. Thus, longer demand chains may be preferred to shorted demand chains, and closed demand chains may be preferred to open chains. In addition, in this second phase, network system 100 may attempt to merge multiple chains with a maximum number of shared nodes into a single ring to further reduce OLC and wavelength usage.

Figure 2:
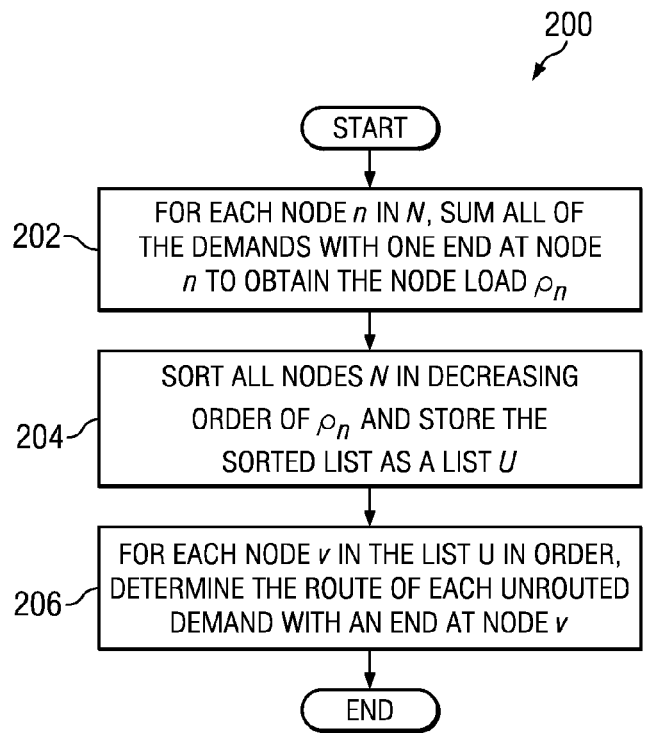
FIG. 2 illustrates a flow chart of an example method for load-balanced routing of demands, in accordance with embodiments of the present disclosure.

FIG. 2 illustrates a flow chart for an example method 200 for load-balanced routing of demands for a given ring topology having N nodes and a demand set including all demands, in accordance with embodiments of the present disclosure. Method 200 may perform the first phase of the process for demand aggregation described above. According to one embodiment, method 200 preferably begins at step 202. As noted above, teachings of the present disclosure may be implemented in a variety of configurations of network system 100. As such, the preferred initialization point for method 200 and the order of the steps 202-206 comprising method 200 may depend on the implementation chosen.

Figures 3, 5:
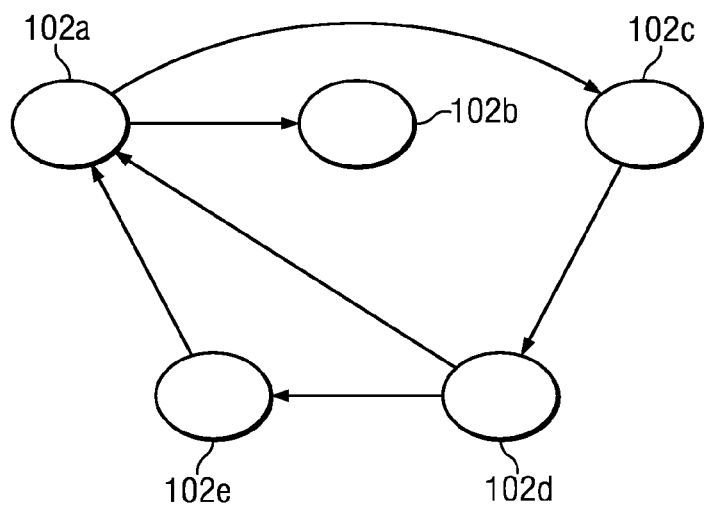
FIG. 3 illustrates a table setting forth an example demands set for a network system and example routing for such demand set, in accordance with embodiments of the present disclosure.
FIG. 5 illustrates a direct demand graph graphically representing an example set of routed demands, in accordance with embodiments of the present disclosure.

For the purposes of illustrating operation of method 200, FIG. 3 illustrates a table setting forth an example demand set for network system 100 and example routing for the demand set determined in accordance with method 200.

At step 202, a network system may, for each node n in N, sum all of the demands with one end at node n to obtain the node load $\rho_n$. Thus, referring to the example demand set given in FIG. 3 for example network system 100 of FIG. 1, $\rho_{102a}=4$, $\rho_{102b}=1$, $\rho_{102c}=2$, $\rho_{102d}=3$, and $\rho_{102e}=2$.

At step 204, the network system may sort all nodes N in decreasing order of $\rho_n$ and store the sorted list as a list U. Thus, referring to the example demand set given in FIG. 3 for example network system 100 of FIG. 1, U={102a, 102d, 102c, 102e, 102b}.

At step 206, the network system may, for each node v in the list U in order, determine the route (either clockwise or counterclockwise in the ring of the network system) of each unrouted demand with an end at node v. In routing each demand for a node v, the network system may attempt to minimize the load imbalance at node v. The load balance may be defined as Diff=$E_v$-$W_v$, where $E_v$ is given by summing the load of all demands carried on a clockwise link of node v, and $W_v$ is the load on the counterclockwise link of node v. In addition, in routing each demand, network system 100 may attempt limit the length (e.g., number of nodes in a route) of the demand route. In order to limit route length, the network system may enforce a maximum route length. For example, the network system mat limit route length to N+2-$L_{thr}$, where $L_{thr}$ is the longest route length of clockwise-routed demands from a node v (for Diff>0) or that of counterclockwise-routed demands from a node v (for Diff<0). Applying step 206 to the example demand set given in FIG. 3 for example network system 100 of FIG. 1, the network system may first perform routing for the demands with an end at node 102a, as it is the first node listed in U. In minimizing load imbalance and route length, the network system may (as shown in the third column of the table in FIG. 3) route the demand between nodes 102a and 102b in a clockwise direction from node 102a, the demand between nodes 102a and 102c in a clockwise direction from node 102a, the demand between nodes 102a and 102d in a counterclockwise direction from node 102a, and the demand between nodes 102a and 102e in a counterclockwise direction from node 102a. With such routing, no route length is greater than two nodes, and bandwidth demands of the links of node 102a are as balanced as possible (84 in the counterclockwise direction, and 96 in the clockwise direction). Next, the network system may perform routing for demands with and end at node 102d, as it is the second node listed in U. In minimizing load imbalance and route length, the network system may (as shown in the third column of the table in FIG. 3) route the demand between nodes 102d and 102c in a clockwise direction from node 102c, and the demand between nodes 102d and 102e in a clockwise direction from node 102d. With such routing, no route length is greater than a node, with the tradeoff being an imbalance of the links of node 102d are as balanced as possible (60 in the counterclockwise direction, and 12 in the clockwise direction).

After completion of step 206, method 200 may end. Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software embodied in a memory.

Figure 4:
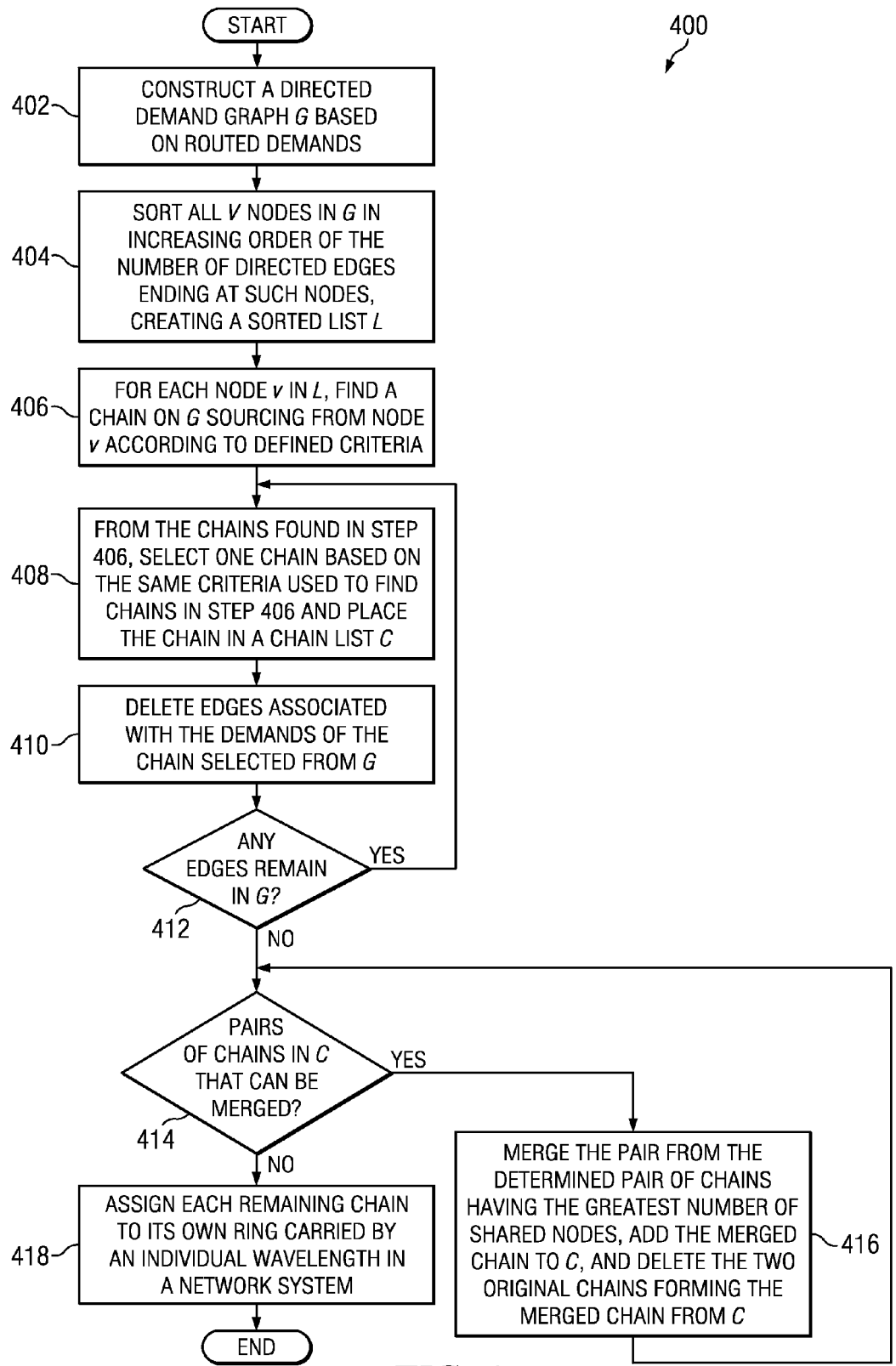
FIG. 4 illustrates a flow chart for an example method for chain-based wavelength assignment of demands, in accordance with embodiments of the present disclosure.

FIG. 4 illustrates a flow chart for an example method 400 for chain-based wavelength assignment of demands, in accordance with embodiments of the present disclosure. Method 400 may perform the second phase of the process for demand aggregation described above. According to one embodiment, method 400 preferably begins at step 402. As noted above, teachings of the present disclosure may be implemented in a variety of configurations of network system 100. As such, the preferred initialization point for method 400 and the order of the steps 402-418 comprising method 400 may depend on the implementation chosen. At step 402, a network system may, based on the load-balanced routing performed in method 200, construct a directed demand graph G=(V, E), where V is the set of nodes, E is the set of directed edges. Each directed edge represents a routed demand. An edge e may exist between a node u and a node v if and only if there is a demand routed between node u and node v in a clockwise direction from node u to node v. Thus, referring to the example demand set given in FIG. 3 for example network system 100 of FIG. 1 and the routed demands established pursuant to method 200, the directed demand graph for example network system 100 may be in the form of that depicted in FIG. 5.

At step 404, the network system may sort all V nodes in G in increasing order of the number of directed edges ending at such nodes, creating a sorted list L. Again referring to the example demand set given in FIG. 3 for example network system 100 of FIG. 1, L={102b, 102c, 102d, 102e, 102a}.

At step 406, for each node v in L, the network system may find a chain on G sourcing from node v according to the following criteria: (a) prefer a closed chain to an open chain; (b) for the same chain type, prefer a longer chain; (c) for the same chain type and length, prefer the chain with smaller average link bandwidth.

Applying step 406 to the example demand set given in FIG. 3 for example network system 100 of FIG. 1, the network system may first attempt to find a chain originating from node 102b as it is the first node listed in L. However, given that no edges originate from node 102b, no chain originating from node 102b exists. Network system may then attempt to find a chain originating from node 102c, as it is the next node listed in L. Applying the criteria above, the closed chain 102c-102d-102e-102a-102c may be found. Similarly, the application of step 406 may also find the following chains for other nodes in L:

For node 102d: 102d-102e-102a-102c-102d
For node 102e: 102e-102a-102c-102d-102e
For node 102a: 102a-102c-102d-102e-102a At step 408, the network system may, from the chains found in step 406, select one chain based on the same criteria used to find chains in step 406 and place the chain in a chain list C. For the example set forth in FIG. 5, all four chains found in step 406 are equal in terms of meeting the criteria and thus, any of the four chains may be selected. For purposes of continued discussion of this example, it will be assumed that the chain 102c-102d-102e-102a-102c is selected.

At step 410, the network system may delete edges associated with the demands of the chain selected in step 408 from G. Referring again to the running example illustrated in FIGS. 3 and 5, application of step 410 may leave the directed edge from node 102d to node 102a and the directed edge from node 102a to 102b, and delete all other edges.

At step 412, the network system may determine if any edges remain in G. If edges remain, method 400 may proceed again to step 406. Otherwise, if no edges remain, method 400 may proceed to step 414.

Referring to the running example illustrated in FIGS. 3 and 5, after the first execution of step 412 edges remain in G, and thus method 400 would return to step 408. Applying steps 406-410 to the remaining graph G, an open chain 102d-102a-102b may be found and selected. After removal of the edges for such chain from G, G would have no remaining edges, and method 400 would proceed to step 414.

At step 414, a network system may determine pairs of chains in C that can be merged such that the chains may be placed into a ring without violating capacity constraints of the ring. In the running example depicted in FIGS. 3 and 5, the chains 102c-102d-102e-102a-102c and 102d-102a-102b may be merged provided that capacity constraints are 96 or less. If any such pairs exist, method 400 may proceed to step 416. Otherwise, method 400 may proceed to step 418.

At step 416, a network system may merge the pair from the determined pair of chains having the greatest number of shared nodes, add the merged chain to C, and delete the two original merged chains from C. After completion of step 416, method 400 may proceed again to step 414. In the running example depicted in FIGS. 3 and 5, chains 102c-102d-102e-102a-102c and 102d-102a-102b may be merged into a chain 102c-102d-102e-102a-102b-102c.

At step 418, the network system may assign each remaining chain to its own ring carried by an individual wavelength in the network system. Thus, in the running example depicted in FIGS. 3 and 5, the chain 102c-102d-102e-102a-102b-102c may be assigned to a single ring carried by an individual wavelength in network system 100. After completion of step 418, method 400 may end.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software embodied in a memory.

Modifications, additions, or omissions may be made to network 10 without departing from the scope of the disclosure. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for demand aggregation, comprising:
routing demands in a ring network such that:
a length for each routed demand does not exceed a route length maximum; and
a load imbalance at each node in the ring network is minimized, wherein the load imbalance at each node comprises the difference between the sum of the load of all demands carried on a clockwise link of the each node and the sum of the load of all demands carried on a counterclockwise link of the each node; and
maximizing optical line card sharing by assigning routed demands sharing common ends to the same wavelength.

2. A method according to claim 1, wherein routing demands in the ring network comprises:
for each node of the ring network, summing all demands with one end at the node to obtain a node load for the node;
sorting all nodes in decreasing order of their respective node loads in an ordered list; and
for each node in order of the ordered list, determine the route of each unrouted demand with an end at the node.

3. A method according to claim 1, wherein maximizing optical line card sharing comprises:
constructing a directed demand graph based on routed demands;
sorting all nodes in the directed demand graph in increasing order of the number of directed edges ending at such nodes in an ordered list;
for each node in the ordered list, finding a chain sourcing from the node according to defined criteria, wherein pursuant to the defined criteria:
a closed-type chain is preferred to an open-type chain;
for the same chain type, prefer the longest chain; and
for the same chain type and length, prefer the chain with smaller average link bandwidth;
from each of the chains found for the nodes of the ordered list, selecting a chain according to the defined criteria;
storing the chain in a chain list;
deleting edges from the directed graph associate with the demands of the selected chain;
iteratively repeat the steps of finding a chain, selecting a chain, and storing the chain until no more edges remain in the directed graph.
merging two or more chains of the chain list to form one or more merged chains; and
assigning each merged chain and unmerged chain to its own ring carried by an individual wavelength.

4. A method according to claim 3, wherein merging two or more chains comprises:
determining if any pairs of chains in the chain list can be merged;

merging a pair from the determined pairs of chains having the greatest number of shared nodes;

adding the merged chain to the chain list; and deleting the pair of chains forming the merged chain from the chain list.

5. A method according to claim 4, further comprising repeating the merging, adding, and deleting steps as long as pairs of chains exist in the chain list that can be merged.

6. A method according to claim 3, the demand graph having nodes and directed edges representing a routed demand between two nodes.

7. A method according to claim 6, wherein a directed edge may exist between a first node and a second node of the demand graph if a demand is routed between the first node and the second node in a clockwise direction.

8. An article of manufacture for aggregating demands in a network system, the article comprising:

a non-transitory computer readable medium; and computer-executable instructions carried on the non-transitory computer readable medium, the instructions readable by a processor, the instructions, when read and executed, for causing the processor to:

route demands in a ring network such that:

a length for each routed demand does not exceed a route length maximum; and a load imbalance at each node in the ring network is minimized, wherein the load imbalance at each node comprises the difference between the sum of the load of all demands carried on a clockwise link of the each node and the sum of the load of all demands carried on a counterclockwise link of the each node; and maximize optical line card sharing by assigning routed demands sharing common ends to the same wavelength.

9. An article of manufacture according to claim 8, wherein routing demands in the ring network comprises:

for each node of the ring network, summing all demands with one end at the node to obtain a node load for the node;

sorting all nodes in decreasing order of their respective node loads in an ordered list; and for each node in order of the ordered list, determine the route of each unrouted demand with an end at the node.

10. An article of manufacture according to claim 8, wherein maximizing optical line card sharing comprises:

constructing a directed demand graph based on routed demands;

sorting all nodes in the directed demand graph in increasing order of the number of directed edges ending at such nodes in an ordered list;

for each node in the ordered list, finding a chain sourcing from the node according to defined criteria, wherein pursuant to the defined criteria:

a closed-type chain is preferred to an open-type chain;

for the same chain type, prefer the longest chain; and for the same chain type and length, prefer the chain with smaller average link bandwidth;

from each of the chains found for the nodes of the ordered list, selecting a chain according to the defined criteria;

storing the chain in a chain list;

deleting edges from the directed graph associate with the demands of the selected chain;

iteratively repeat the steps of finding a chain, selecting a chain, and storing the chain until no more edges remain in the directed graph.

merging two or more chains of the chain list to form one or more merged chains; and assigning each merged chain and unmerged chain to its own ring carried by an individual wavelength.

11. An article of manufacture according to claim 10, wherein merging two or more chains comprises:

determining if any pairs of chains in the chain list can be merged;

merging a pair from the determined pairs of chains having the greatest number of shared nodes;

adding the merged chain to the chain list; and deleting the pair of chains forming the merged chain from the chain list.

12. An article of manufacture according to claim 11, the instructions further for causing the processor to repeat the merging, adding, and deleting steps as long as pairs of chains exist in the chain list that can be merged.

13. An article of manufacture according to claim 10, the demand graph having nodes and directed edges representing a routed demand between two nodes.

14. An article of manufacture according to claim 13, wherein a directed edge may exist between a first node and a second node of the demand graph if a demand is routed between the first node and the second node in a clockwise direction.

15. An optical node for use in an optical ring network, the optical node configured to, alone or in concert with one or more other optical nodes of the optical ring network:

route demands in the ring network such that:

a length for each routed demand does not exceed a route length maximum; and a load imbalance at each node in the ring network is minimized, wherein the load imbalance at each node comprises the difference between the sum of the load of all demands carried on a clockwise link of the each node and the sum of the load of all demands carried on a counterclockwise link of the each node; and maximize optical line card sharing by assigning routed demands sharing common ends to the same wavelength.

16. An optical node according to claim 15, wherein routing demands in the ring network comprises:

for each node of the ring network, summing all demands with one end at the node to obtain a node load for the node;

sorting all nodes in decreasing order of their respective node loads in an ordered list; and for each node in order of the ordered list, determine the route of each unrouted demand with an end at the node.

17. An optical node according to claim 15, wherein maximizing optical line card sharing comprises:

constructing a directed demand graph based on routed demands;

sorting all nodes in the directed demand graph in increasing order of the number of directed edges ending at such nodes in an ordered list;

for each node in the ordered list, finding a chain sourcing from the node according to defined criteria, wherein pursuant to the defined criteria:

a closed-type chain is preferred to an open-type chain;

for the same chain type, prefer the longest chain; and for the same chain type and length, prefer the chain with smaller average link bandwidth;

from each of the chains found for the nodes of the ordered list, selecting a chain according to the defined criteria;

storing the chain in a chain list;

deleting edges from the directed graph associate with the demands of the selected chain;

iteratively repeat the steps of finding a chain, selecting a chain, and storing the chain until no more edges remain in the directed graph.

merging two or more chains of the chain list to form one or more merged chains; and assigning each merged chain and unmerged chain to its own ring carried by an individual wavelength.

18. An optical node according to claim 17, wherein merging two or more chains comprises:

determining if any pairs of chains in the chain list can be merged;

merging a pair from the determined pairs of chains having the greatest number of shared nodes;

adding the merged chain to the chain list; and deleting the pair of chains forming the merged chain from the chain list.

19. An optical node according to claim 18, further configured to repeat the merging, adding, and deleting steps as long as pairs of chains exist in the chain list that can be merged.

20. An optical node according to claim 17, the demand graph having nodes and directed edges representing a routed demand between two nodes.

21. An optical node according to claim 20, wherein a directed edge may exist between a first node and a second node of the demand graph if a demand is routed between the first node and the second node in a clockwise direction.

* * * * *